United States Patent [19]
Aprill, Jr.

[11] 3,975,944
[45] Aug. 24, 1976

[54] HYDROSTATIC TESTING AND RECORDING APPARATUS

[75] Inventor: Theophil Aprill, Jr., Ann Arbor, Mich.

[73] Assignee: Allied Automotive, Inc., Ann Arbor, Mich.

[22] Filed: June 23, 1975

[21] Appl. No.: 589,408

[52] U.S. Cl. .............................. 73/40.5 R; 73/37; 73/168
[51] Int. Cl.² ........................................ G01M 3/26
[58] Field of Search ............... 73/37, 40, 40.5 R, 168

[56] References Cited
UNITED STATES PATENTS

| | | | |
|---|---|---|---|
| 3,100,986 | 8/1963 | Starr et al. | 73/40 |
| 3,418,843 | 12/1968 | Bosshart | 73/37 |
| 3,577,768 | 5/1971 | Aprill, Jr. et al. | 73/40.5 R |
| 3,748,898 | 7/1973 | Hellouin de Menibus | 73/168 |

Primary Examiner—Richard C. Queisser
Assistant Examiner—Joseph W. Roskos
Attorney, Agent, or Firm—Olsen and Stephenson

[57] ABSTRACT

Apparatus for hydrostatically testing hydraulic equipment and/or for recording the results of the hydrostatic test. The apparatus includes a reservoir for hydraulic fluid, supply means for supplying hydraulic fluid under pressure to the equipment being tested, a first pressure gauge assembly including a fitting to the equipment being tested and a first pressure gauge in communication with the fitting for registering the pressure in the equipment, a second pressure gauge for recording the pressure in the equipment as a function of time, and valve means for isolating either or both of said first and said second pressure gauges from the reservoir for the hydraulic fluid during the time the test is being conducted.

4 Claims, 1 Drawing Figure

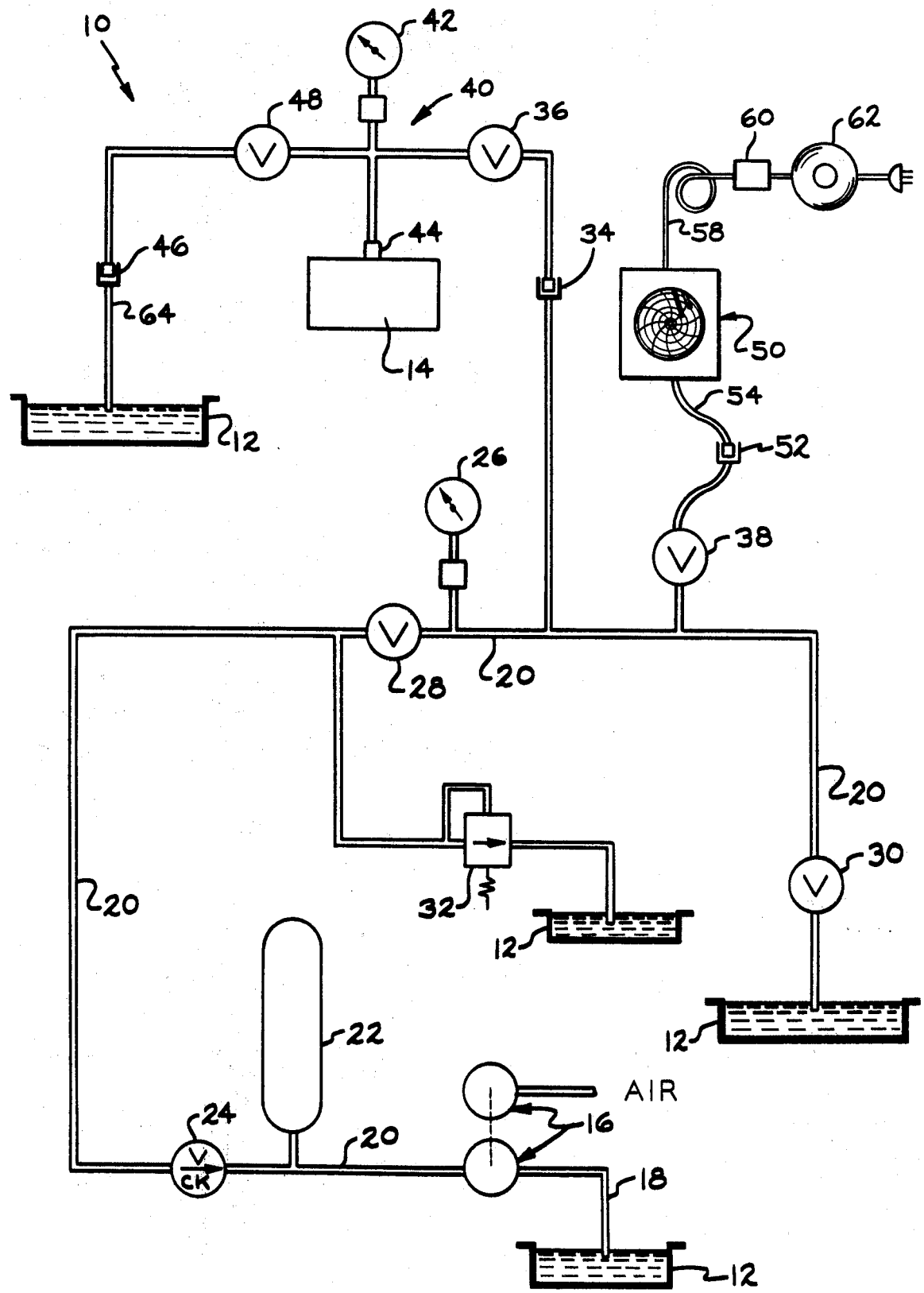

HYDROSTATIC TESTING AND RECORDING APPARATUS

BACKGROUND OF THE INVENTION

The present invention relates to hydrostatic testing apparatus that can be used for testing a variety of types of hydraulic systems and for recording the results of such tests, when desired.

It is known to provide hydrostatic testing apparatus of the type disclosed in U.S. Pat. No. 3,577,768, granted May 4, 1971 to Aprill, Jr., et al. Apparatus of this character operates very satisfactory for conducting hydrostatic tests, but a further need exists for an improved apparatus which will enable the operator of the testing apparatus to provide documentary evidence of the authenticity of the test with respect to duration of time and pressure at which the test was conducted.

SUMMARY OF THE INVENTION

The present invention has overcome the inadequacies of the prior art and provides hydrostatic testing apparatus for conducting tests corresponding to those that can be performed by the apparatus disclosed in said U.S. Pat. No. 3,577,768, and which provides for optional use additional features enabling the operator to record the results of a test with respect to time and pressure, the duration and magnitude of which can be selected according to the desires of the operator.

According to one form of the present invention apparatus is provided for hydrostatically testing a hydraulic system and recording the results thereof comprising a reservoir for hydraulic fluid, a fitting adapted to be connected to the hydraulic system, a pressure gauge mounted in communication with the fitting for registering the pressure in the system when the fitting is so connected, a recording pressure gauge mounted in communication with said fitting for recording the pressure in said system for a selected time period when the fitting is so connected, supply means including a pump for supplying hydraulic fluid under pressure from said reservoir to said fitting, return means for returning to the reservoir hydraulic fluid supplied by said supply means, first valve means for isolating the first pressure gauge and the fitting from the supply means and said return means, and additional valve means for isolating said recording pressure gauge and said fitting from said pump and said reservoir. The supply means includes an adjustable pressure relief valve for setting minimum pressure of the hydraulic fluid to be delivered to the fitting for conducting the hydrostatic test, the adjustable relief valve being located down-stream of the additional valve means. In the preferred form of the invention the recording pressure gauge is an electrically driven one-pen recorder for recording the pressure of the hydraulic fluid as a function of time.

Accordingly, it is an object of the present invention to provide improved test apparatus for testing hydraulic systems and recording the results of the tests, when desired.

Other objects of this invention will appear in the following description and appended claims, reference being had to the accompanying drawing forming a part of this specification wherein like reference characters designate corresponding parts in the several views.

BRIEF DESCRIPTION OF THE DRAWING

The FIGURE of the drawing is a schematic diagram of the hydraulic circuits of the apparatus embodying the present invention.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The test apparatus 10 preferably is portable such as is shown in the aforesaid U.S. Pat. No. 3,577,768 to which reference is made for a more detailed description of its portable features. The hydrostatic testing and recording apparatus 10 includes the reservoir 12 for hydraulic fluid which can be introduced to a hydraulic system 14 for conducting hydrostatic tests of the latter. A hydraulic pump and associated air motor 16 are provided, the air motor being adapted to be driven by compressed air. The hydraulic pump and motor 16 are arranged with the suction side of the pump in communication with the reservoir 12 by means of the conduit 18 and the discharge side of the hydraulic pump is in communication with the conduit 20, which, if all valves along the main branch are in an open position will discharge back to the reservoir 12. A surge tank 22 is in direct communication with the conduit 20 to reduce or eliminate pulsations which may occur during the pumping operation so as to avoid damaging pressure gauges and the like in the system. A check valve 24 is provided to prevent return flow, and pressure gauge 26 is provided for indicating the pressure in the conduit 20. Suitable stop valves, such as ball valves are provided at 28 and 30. An adjustable relief valve 32 is provided down-stream from the valve 28 for use when tests are being conducted to establish the minimum working pressure to which the hydraulic system 14 is to be subjected. The minimum working pressure is established by closing valve 30, disconnecting the quick-disconnect coupling 34 or closing shut-off valve 36, closing shut off or ball valve 38, and then pressurizing the conduit 20 and mechanically adjusting the relief valve 32 until the desired minimum test pressure is indicated on gauge 26.

The hydrostatic testing and recording apparatus 10 includes the pressure gauge assembly 40 which is essentially the same as the corresponding assembly disclosed in the aforesaid U.S. Pat. No. 3,577,768. This assembly includes the pressure gauge 42, the fitting 44, which is adapted to be connected to the hydraulic system 14, the quick-disconnect couplings 34 and 46, and the stop or ball valves 36 and 48.

Also comprising a part of the hydrostatic testing and recording apparatus 10 is the recording pressure gauge or recorder 50 which is adapted to be placed in communication with the conduit 20 by means of the quick-disconnect coupling 52 and stop valve 38. The recording pressure gauge 50 is an electrically driven, single pen, time/pressure recording device of the type that are well known in the art, and therefore, a detailed description will not be provided. In the conventional manner, the recorder or recording pressure gauge 50 inks on a time chart the pressure under which the test is being conducted from start to finish and scribes the profile of this test on the time chart within a predetermined pressure range, such as from 0 pounds per square inch to 570 pounds per square inch.

The recording assembly includes the flexible or rigid conduit 54, the pressure gauge and recorder 50, an electric conductor 58 from the recorder 50 to the junction box 60, and a cord-reel and extension cord 62.

In operation of the hydrostatic testing and recording apparatus 10, the valve 30 will initially be closed and the pressure gauge assembly 40 will be connected to a suitable fitting in the hydraulic system 14 that is to be tested. Normally, the connection will be made to a fitting which is part of or is in communication with the reservoir of the system to be tested.

After the fitting 44 has been connected to the appropriate fitting of the system 14, the quick-disconnect couplings 34 and 46 are connected to the supply and return conduits 20 and 64. The complete sequence of steps used to test a specific hydraulic system will not be given in detail, because the sequence of steps followed will necessarily vary when different types of systems are being tested. However, it is to be understood that when the pressure gauge assembly 40 is connected to the system, hydraulic fluid under a selected pressure will be supplied from the test apparatus 10 to the system 14 via supply means 20, open valve 36 and fitting 44. For this purpose valve 48 will be closed. Thereafter, when the pressure in system 14 has reached the desired magnitude, such as 300 pounds per square inch, for example, the valve 36 can be closed, thereby isolating the pressure gauge 42 and the fitting 44 from the supply and return means 20 and 64 while allowing the pressure gauge 42 to register the pressure in system 14. If the system 14 will then hold the pressure within the prescribed limits, such as 10 pounds per square inch, for a predetermined time period, such as for not less than 30 minutes, the system 14 will pass the test. Failure of the system 14 to meet the test standard will require additional test procedures to be followed to locate the site of the leakage. When the test is completed, the hydraulic fluid supplied from the test apparatus 10 can be returned by opening valve 48.

It is to be noted that, if desired, the pressure gauge assembly 40 can be disconnected from the remainder of the test apparatus 10 while the timed testing is occurring, because the closed valves 36 and 48 will allow the quick-disconnect couplings 34 and 46 to be disconnected from the remainder of the test apparatus while pressure within the system 14 will continue to be registered by the pressure gauge 42. Thus, if desired, a second system, similar to system 14 can be tested using a second test gauge assembly corresponding to the assembly 40.

In those instances where it is required that the results of the test be recorded so that certification of the hydrostatic integrity of the hydraulic system 14 can be provided, it is necessary that the recorder assembly 50 be maintained in communication with the hydraulic system 14 throughout the test. For this purpose, the valve 28 is provided which in conjunction with valve 30 will serve as additional valve means to isolate the recording pressure gauge 50 and the fitting 44 from the pump 16 and reservoir 12. Thus, after the desired pressure has been imposed upon the hydraulic system 14, the valves 28 and 30 will be maintained in a closed position, and a starting point can then be marked on the time chart of the recorder 50 and the scribing on the chart can then be maintained for the desired time period, such as 30 minutes, during the entire period of which the pressure will be recorded as a function of time. Any fluctuation in pressure will therefore be graphically recorded. This will provide documentary proof required for certification of the hydrostatic integrity of the hydraulic system 14.

If a system failure should occur, it will be indicated and after repair the retest can be accomplished on the same time chart to provide a before and after record. The hydrostatic testing and recording apparatus 10 can be portable in nature, corresponding to the apparatus shown in U.S. Pat. No. 3,577,768, and the recorder 50, being electrically operated, can be connected to any suitable source of electricity by means of the extension cord and reel 62.

From the foregoing description it is apparent that the hydrostatic testing and recording apparatus can be used merely to test a hydraulic system 14 without recording the results of the test, or if it is desirable to provide a documentary record of the test that was conducted, this can readily be supplied by means of the recorder apparatus 50.

It is claimed:

1. Apparatus for hydrostatically testing a hydraulic system and recording the results thereof comprising a reservoir for hydraulic fluid, a fitting adapted to be connected to said hydraulic system, a first pressure gauge mounted in communication with said fitting for registering the pressure in said system when the fitting is so connected, a recording pressure gauge mounted in communication with said fitting for recording the pressure in said system for a selected time period when the fitting is so connected, supply means including a pump for supplying hydraulic fluid under pressure from said reservoir to said fitting, return means for returning to said reservoir hydraulic fluid supplied by said supply means, first valve means for isolating said first pressure gauge and said fitting from said supply means and said return means, and additional valve means operable in conjunction with said first valve means for isolating said recording pressure gauge and said fitting from said pump and said reservoir.

2. The apparatus that is defined in claim 1, wherein a pressure gauge assembly is releasably connected in series between said supply means and said return means, said assembly including said fitting, said first pressure gauge and said first valve means.

3. The apparatus that is defined in claim 1, wherein said supply means includes and adjustable pressure relief valve for setting the minimum pressure of hydraulic fluid to be delivered to said fitting for conducting the hydrostatic test, said adjustable relief valve being located upstream of said additional valve means.

4. The apparatus that is defined in claim 1, wherein said recording pressure gauge is an electrically driven one-pen recorder for recording the pressure of the hydraulic fluid as a function of time.

* * * * *